United States Patent [19]

Siegrist

[11] Patent Number: 4,501,291

[45] Date of Patent: Feb. 26, 1985

[54] RELIEF VALVE ARRANGEMENT

[75] Inventor: Ronald Siegrist, Oberuzwil, Switzerland

[73] Assignee: Vickers, Incorporated, Troy, Mich.

[21] Appl. No.: 524,682

[22] Filed: Aug. 19, 1983

[30] Foreign Application Priority Data

Aug. 19, 1982 [EP] European Pat. Off. ........ 82107565.2

[51] Int. Cl.³ .............................................. F16K 17/06
[52] U.S. Cl. ..................................... 137/529; 251/63.4
[58] Field of Search ................ 137/528, 529; 251/63.4

[56] References Cited

U.S. PATENT DOCUMENTS 2,944,564  7/1960  Pettey ................................. 137/529
3,017,897  1/1962  Seguenot ............................ 137/529
4,019,713  4/1977  Kalb .............................. 251/63.4 X

FOREIGN PATENT DOCUMENTS 2714410 10/1977 Fed. Rep. of Germany ..... 251/63.4

Primary Examiner—Robert G. Nilson
Attorney, Agent, or Firm—Barnes, Kisselle, Raisch Choate, Whittemore & Hulbert

[57] ABSTRACT

Relief valve arrangement comprising a pressure limiting relief valve, the pressure setting thereof can be switched by an auxiliary piston between two or more ranges so that the control pressure, which is obtained by a pilot valve, can be within a region, which can be controlled accurately.

6 Claims, 3 Drawing Figures

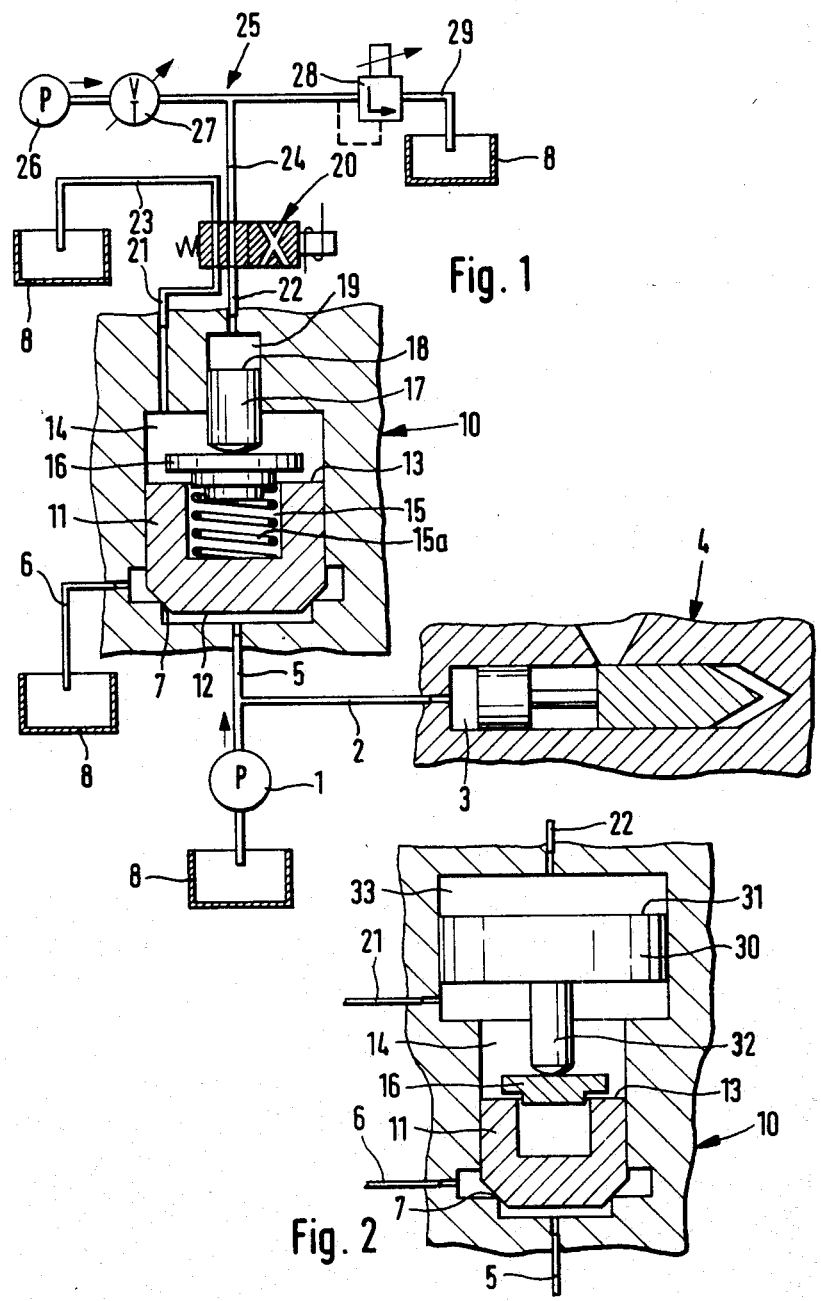

RELIEF VALVE ARRANGEMENT

The present invention relates to relief valve arrangements and more particularly to those having at least two selectable ranges of limiting pressure.

BACKGROUND OF THE INVENTION

In injection molding machines, there is an injecting screw comprising a piston which is acted upon by a pressure of about 120 to 200 bar at the injection stroke, whereas when filling the injection molding machine, a pressure of about 5 through 10 bar is applied. In order to get such different pressure settings, generally a pressure limiting arrangement consisting of a main relief valve and a proportional pilot valve is used, the setting thereof is adjusted electrically. The accuracy of pressure setting of the pilot valve determines the accuracy of the whole arrangement. In view of the large range to be covered from 5 to 200 bar, it is not possible to adjust the pilot valve really onto the desired pressure setting, if same is near to the limits of the range. Since it is very important to hold the injection pressure precisely, the type of pilot valve is selected in view of the higher pressure value of 120 through 200 bar. Such a pilot valve does not work precisely for the filling pressure in the region of about 5 to 10 bar.

OBJECTS AND SUMMARY OF THE INVENTION

An object of the present invention is to provide a relief valve arrangement of the described type having at least two pressure regions, each of which are sufficiently small so as to be covered by the pressure region of accuracy of the pilot valve.

Another object of the invention is to provide a relief valve arrangement having at least two selectable ranges of limiting pressure settings wherein the pressure setting can be adjusted electrically.

A further object of the invention is to provide a relief valve arrangement which is adapted for the operation of an injection molding machine.

The foregoing and other objects are obtained in accordance with the present invention by providing a pressure limiting relief valve comprising a main piston, the first piston area thereof is exposed to the pressure to be monitored and the second piston area to a control pressure or low pressure and, as the case is, the force of a valve spring, varying the control pressure being possible for adjusting the limiting pressure setting in the first pressure limiting region. An auxiliary piston having a pressure area which is smaller or larger by a factor in relation to the first piston area, acts upon the main piston. The control pressure can be switched from the second piston area of the main piston onto the pressure area of the auxiliary piston and vice versa.

The proposed concept is applicable to any apparatus where at least two ranges of system pressure are present and wherein limiting pressures must be kept very precisely.

BRIEF DESCRIPTION OF THE DRAWINGS

The invention, together with additional objects, features and advantages thereof will be best understood from the following description, the appended claims and the accompanying drawings in which:

FIG. 1 is a schematic diagram of a relief valve arrangement according to a first embodiment as applied to an injection molding machine, and FIG. 2 shows a detail of a second embodiment of the invention.

DETAILED DESCRIPTION OF THE PREFERRED EMBODIMENTS

Figure 3:
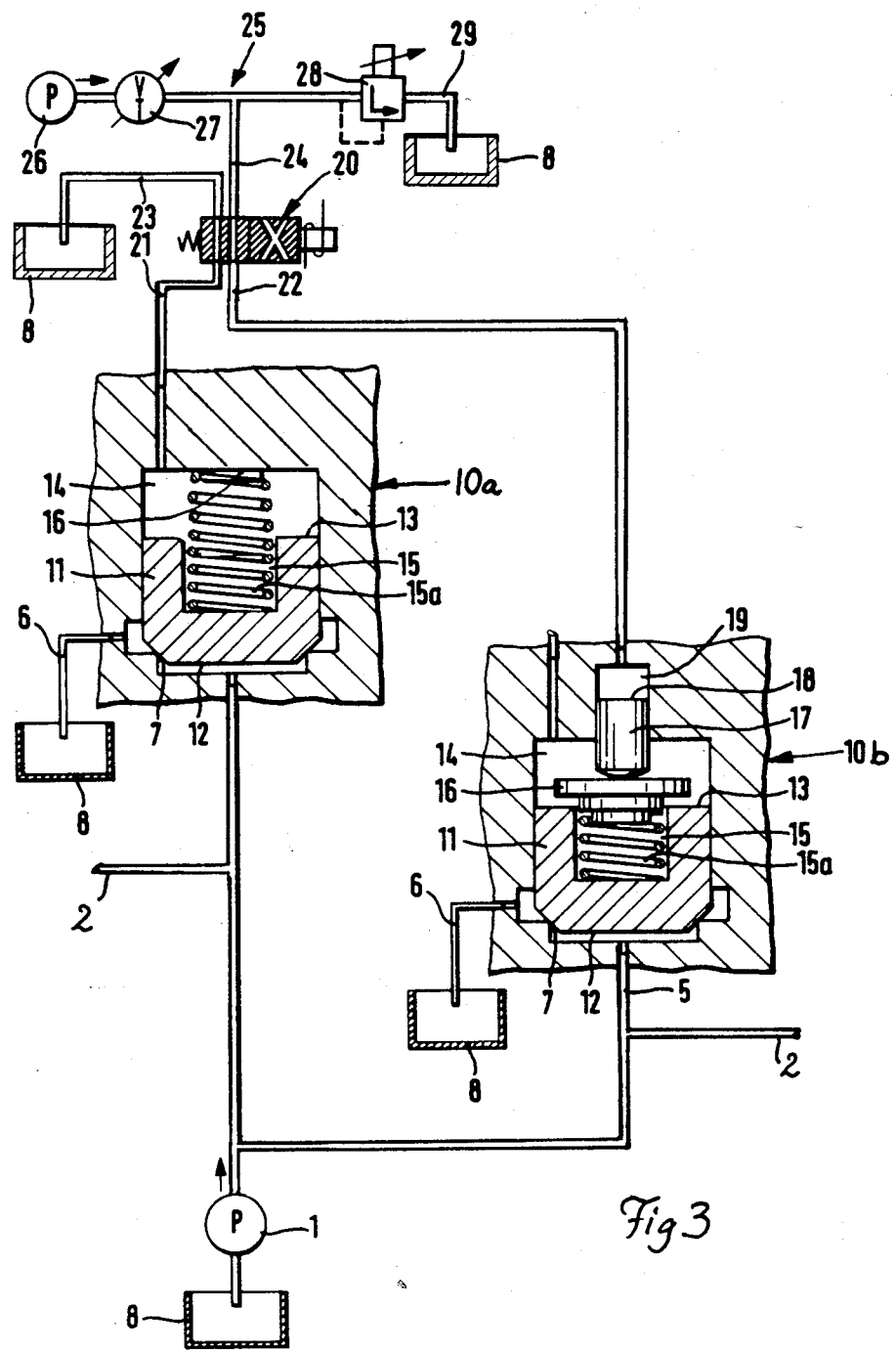
FIG. 3 is a schematic diagram of a modified arrangement including two relief valves.

A main pump 1 delivers hydraulic fluid in a main line 2 into a cylindric chamber 3 of an injection molding machine 4. From line 2 a branch line 5 is diverted and leads to a main relief valve 10 which has a main piston 11 and closes off or opens the connection to a tank line 6. The main piston 11 has a first piston area 12 at an inlet chamber which is connected to the pressure in the lines 2 and 5 which is to be monitored. The main piston 11 also has a second piston area 13 which is arranged in a control chamber 14. Within the piston 11 a spring seat recess 15 is provided to which a cover 16 is assigned to. Between the lower surface of the recess 15 and the lower side of the cover 16 which is formed as a spring seat, a valve spring 15a is arranged. The upper side of the cover 16 contacts an auxiliary piston 17, which has a lower area exposed to pressure in chamber 14, and a further area exposed to pressure in a second control chamber 19.

A four-way-directional valve 20 is for switching lines 21, 22, 23 and 24, line 21 leading in chamber 14, line 22 in chamber 19, line 23 to low pressure or tank 8 and line 24 to a source 25 of control pressure.

The source of control pressure 25 comprises a pump 26, an orifice 27 which can be set or remote controlled, and a pilot valve 28 which electrically can be adjusted on a pressure setting and is connected through line 29 to low pressure tank 8. Hydraulic fluid delivered by pump 26 flows through the hydraulic bleed circuit 27, 28, 29 so that in the region of line 24, a defined pressure is attained which depends from the setting of the pilot valve 28 and therefore can be controlled electrically.

According to the switched position of the directional valve 20, the control pressure is effective in chamber 19 or 14. The areas under pressure 18 and 13, respectively, are different in size so that the force which presses the main piston 11 onto its seat 7 is different according to which of the control chambers 19 or 14 are on control pressure. Whereas area 13 has the same order of magnitude in size as area 12 (in the present case area 13 is a little larger than area 12) the ratio between the area 18 to area 12 is a multiplication factor which largely differs from 1. Accordingly, the control pressure can be used for different regions of the holding force of the relief valve 10 and thus for different pressure setting regions. If the control pressure is extended into control chamber 19, a pressure region between 1 and 50 bar can be precisely set, and when the control pressure passes into chamber 14, the pressure setting in the region of 100 through 250 bar can be accurately adjusted. In the case of an injecting molding machine, these regions cover the desired pressure ranges for the filling pressure and the injection pressure.

FIG. 2 shows a modification of the signal gain device. There is an auxiliary piston 30 having a pressure area 31 which is essentially larger than the second area 13 of the main piston 11. The auxiliary piston 13 contains a ram 32 contacting the upper side of the cover 16 and thus making the mechanic connection to the main piston 11.

There is a second control chamber 33, the cross section thereof being essentially larger than the cross section of the first control chamber 14. All further parts are essentially the same as in FIG. 1.

The modification shown in FIG. 2 makes it possible to apply a smaller pressure region of the control pressure source 25. If the auxiliary piston 30 is loaded on its area 31, the higher pressure setting is switched on, and when the control chamber 14 is on pressure, the lower pressure region of the pressure setting is activated.

It is further possible to arrange the auxiliary piston 17 above the auxiliary piston 30 and to act on same. In this case, a further pressure region for pressure settings can be obtained. Continuing in this manner, further pressure regions can be gained wherein an accurate setting of the limiting pressure is possible for the relief valve arrangement of invention. The directional valve 20 needs six ways or pathes and three positions in case of three control chambers and pistons.

The control pressure source 25 also can include a pressure store instead of a pump 26.

With the invention it is also possible to use only one type of pressure limiting relief valve, though different pressure limiting regions and settings in different places of the systems are to be observed. (FIG. 3) Besides a "normal" relief valve 10a (without auxiliary piston) a relief valve 10b of the same type, however including an auxiliary piston 17 or 30, is used, the directional valve 20 being connected to the normal relief valve 10a and the control chamber of the second relief valve 10b.

What is claimed is:

1. Relief valve arrangement for limiting system pressure within two selectable ranges of pressure settings, the arrangement comprising: means for delivering control pressure, means for delivering low pressure and
   - a main relief valve having a valve body including an inlet chamber connected to system pressure, an outlet chamber connected to low pressure, a first control chamber and a second control chamber,
   - a first piston formed as a valve member having a first piston area at said inlet chamber and a second piston area at said first control chamber,
   - a second piston having a third piston area and a fourth piston area at said second control chamber, said fourth piston area being distinctly different in size from said second piston area, and
   - a directional valve for connecting said control pressure to said first control chamber and said low pressure to said second control chamber, or said control pressure to said second control chamber and said low pressure to said first control chamber.

2. Relief valve arrangement according to claim 1 wherein said means for delivering control pressure comprises a pilot valve having pressure limiting setting means.

3. Relief valve arrangement according to claim 2 wherein said pilot valve is arranged in a hydraulic bleed line, said bleed line also comprising orifice means.

4. Relief valve arrangement according to claim 1 wherein said first control chamber includes a valve spring acting on said second piston area of said first piston.

5. Relief valve arrangement according to claim 4 wherein said first piston includes a recess for seating said valve spring, and further comprises a movable spring seat means, said spring seat means having a first and second face, said first face cooperating with said first piston as a stop and said second face cooperating with said second piston as an abutment.

6. Relief valve arrangement comprising means for delivering system pressure, means for delivering control pressure, means for deliverying low pressure,
   - a first main valve having a valve body including an inlet chamber connected to system pressure, an outlet chamber connected to low pressure, a first control chamber and a second control chamber,
   - a first piston formed as a valve member having a first piston area at said inlet chamber and a second piston area at said first control chamber,
   - a second piston having a third piston area which comprises pushing means to act upon said first piston, and a fourth piston area at said second control chamber, said fourth piston area being distinctly different in size from said second piston area,
   - a second main valve having a valve body including an inlet chamber connected to system pressure, an outlet chamber connected to low pressure, a third control chamber of the same type as said first chamber of said first main relief valve,
   - a third piston formed as a valve member having said first piston area at said inlet chamber and said second piston area at said third control chamber, and
   - a directional valve having two positions, one for connecting said control pressure to said second control chamber and said low pressure to said third control chamber, or—in the second position of the valve—said control pressure to said third control chamber and said low pressure to said second control chamber.

* * * * *